United States Patent [19]
Wright

[11] 3,906,928
[45] Sept. 23, 1975

[54] SOLAR HEATER CONTROL SYSTEM AND METHOD

[75] Inventor: Allen C. Wright, Moraga, Calif.

[73] Assignee: Fafco Incorporated, Redwood City, Calif.

[22] Filed: Mar. 28, 1974

[21] Appl. No.: 455,870

[52] U.S. Cl. ............................ 126/271; 4/172.17
[51] Int. Cl.² ........................................ F24J 3/02
[58] Field of Search ................ 126/271; 4/172.17; 232/1 A; 210/169; 251/5

[56] References Cited
UNITED STATES PATENTS

| | | | |
|---|---|---|---|
| 2,689,090 | 9/1954 | Wetherbee et al. | 237/1 A |
| 3,254,703 | 6/1966 | Thomason | 126/271 X |
| 3,299,881 | 1/1967 | Koch | 126/271 |
| 3,415,276 | 12/1968 | Lind et al. | 251/5 X |
| 3,786,921 | 1/1974 | Johnson | 210/169 X |

*Primary Examiner*—William F. O'Dea
*Assistant Examiner*—Peter D. Ferguson
*Attorney, Agent, or Firm*—Flehr, Hohbach, Test, Albritton & Herbert

[57] ABSTRACT

A pool water heating system used in conjunction with a pool pump and filter wherein the pool water is directed along one of two paths down stream of the filter. One path directs the filtered water directly back to the pool and the other path directs the filtered water through an array of heater panels for transferring heat generated by solar energy to the water prior to returning it to the pool. A solar heat sensor is positioned to sense the temperature induced by solar energy in the location of the heater panels and to provide an electrical signal which is connected to a control valve. A flow direction valve is positioned in the direct flow path to the pool which is urged to pinch off the flow therethrough by pressure directed to a valve chamber therein. Pressure at the filter inlet is directed to one port on the control valve and an exhaust port on the control valve is connected to the inlet side of the pump. When solar heat is available to heat the pool water the solar heat sensor directs the control valve to communicate the filter inlet pressure with the flow direction valve, causing blockage of direct flow to the pool and flow through the heater panels for heating prior to returning to the pool. When solar heat is not available as determined by the solar heat sensor the exhaust port on the control valve is communicated with the pinch valve to bleed the valve chamber therein and allow filtered water to flow directly therethrough to the pool.

9 Claims, 3 Drawing Figures

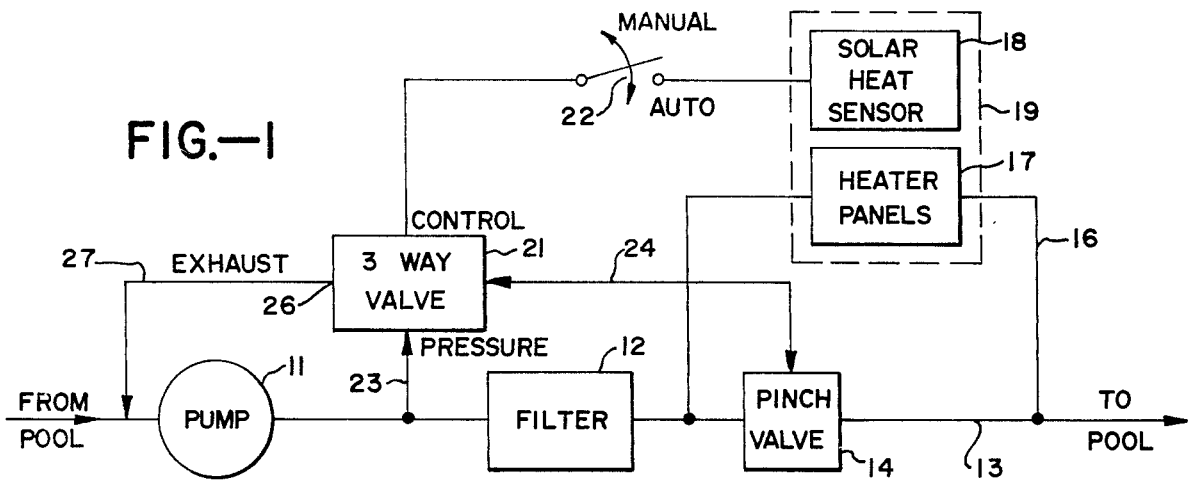
FIG.—1
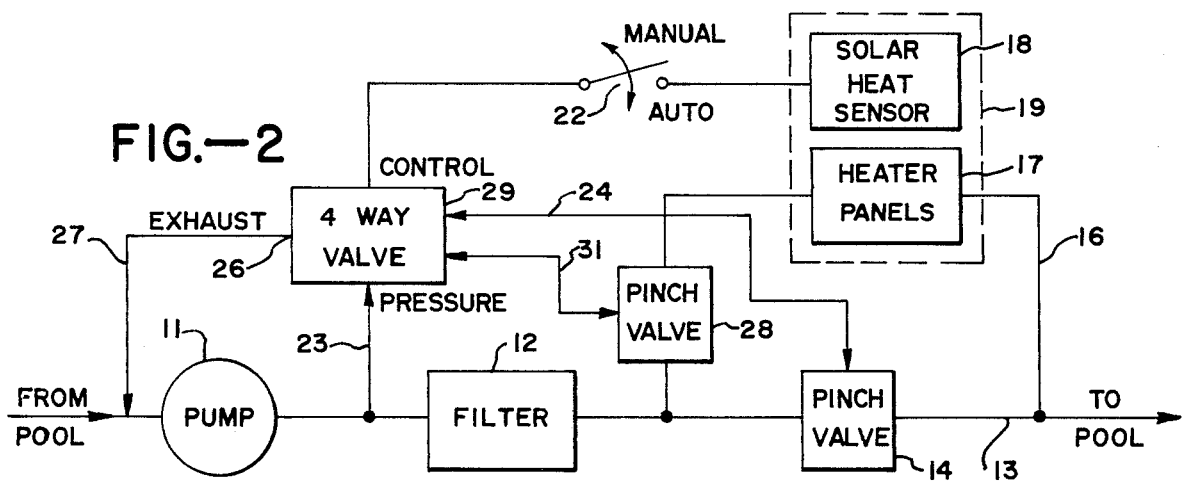
FIG.—2
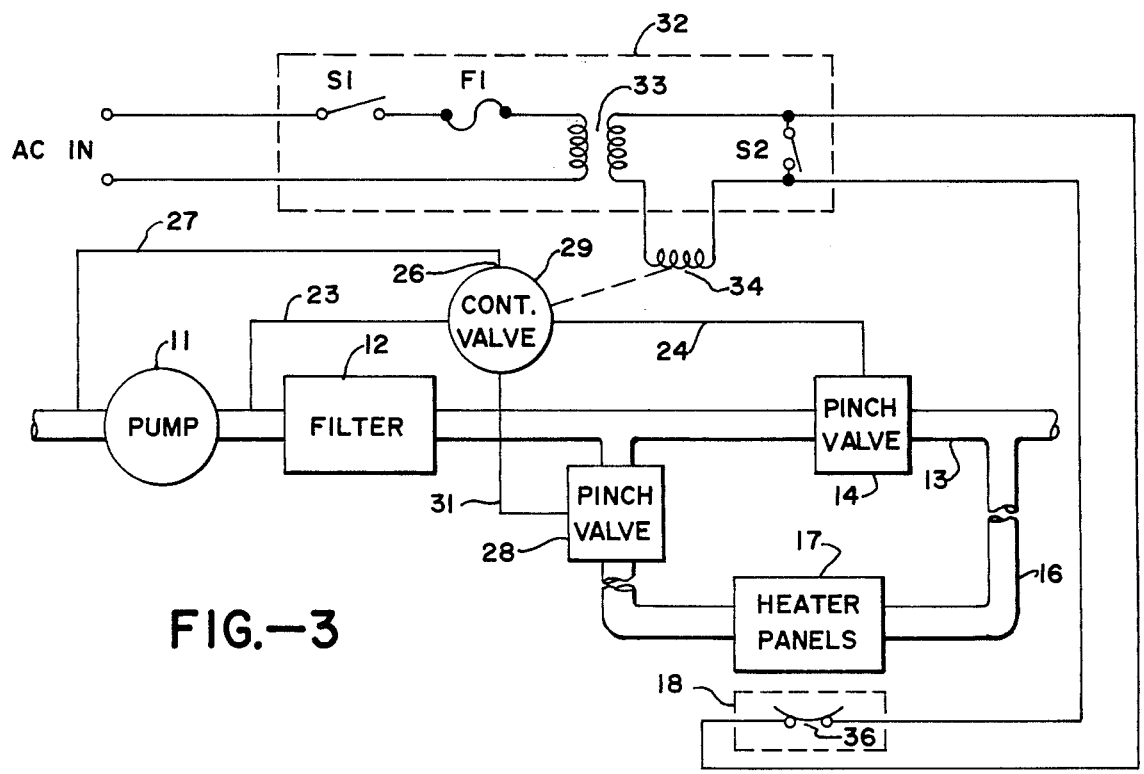
FIG.—3

SOLAR HEATER CONTROL SYSTEM AND METHOD

BACKGROUND OF THE INVENTION

1. Field of the invention

The invention relates to a system for controlling temperature in a confined body of water, and more particularly to a system for automatically heating the water in a swimming pool using solar energy and for cooling the swimming pool water through the use of a manual control.

2. Description of the prior art

Heating systems for confined bodies of water such as swimming pools generally utilize heat energy from burning gas or electric heater elements. Installation, maintenance and operating costs for these types of heater systems are considerable. The water is withdrawn from the pools by a pump associated with a necessary pool water filtering system and is subsequently passed through the heater prior to return to the pool. A heating system for the pool water is needed to either replace or supplement known pool heaters. The replacement or supplementary heater, to be sufficientally attractive, must draw heat energy from a source which will reduce the operating costs normally associated with energy derived from the public utilities.

There is therefore a need for a pool heating system utilizing available solar energy which is relatively inexpensive to install, maintain, and operate.

SUMMARY AND OBJECTS OF THE INVENTION

In general the system disclosed herein is used for controlling the temperature in a confined body of water such as a swimming pool having a pump and a filter associated therewith for removing impurities from the water. Alternate paths exist down stream of the filter, a direct path back to the pool and a path passing through an array of solar heater panels prior to return to the pool. A heat sensor is located to sense the solar energy available for heating at the heater panels. A flow direction valve is positioned in the direct return path to the pool having a control line connected thereto which extends to a control valve. A pressure line extends from a point upstresm of the filter to the control valve. The control valve has an exhaust port which may be connected by an exhaust line to the inlet side of the pump. The heat sensor provides a signal to the control valve which communicates the pressure line to the flow direction valve when solar energy is available at the heater panels sufficient to raise the water temperature above a predetermined temperature. In like manner the heat sensor communicates the exhaust port on the control valve with the flow direction valve when insufficient solar energy is available at the heater panels to raise the water above the predetermined temperature.

In general it is an object of the present invention to provide a system for controlling temperature in a confined body of water which utilizes existing filter system water pressures for controlling the route of water flow through the system.

It is another object of the present invention to provide a system for controlling temperature in a confined body of water which uses only one pressure control valve for blocking a preferred flow path thereby directing the flow through an elevated array of solar heater panels.

Another object of the present invention is to provide a system for controlling temperature in a confined body of water which utilizes water pressure taken from the upstream side of an existing filter for controlling selection of return flow path downstream of the filter to the body of water.

It is another object of the present invention to provide a system for controlling temperature in a confined body of water having pressure controlled flow direction valves in each of two return paths downstream of the filter which are alternately controlled between open and closed position by a control valve receiving control pressure from a point upstream of the filter.

It is another object of the present invention to provide a system for controlling temperature in a confined body of water which may be manually operated to direct flow through an array of solar heater panels to cool the water when the solar energy available is below that required to rise the temperature of the water.

Another object of the present invention is to provide a system for controlling temperature in a confined body of water wherein the pressure controlled flow direction valve is positively opened by control pressure after being in a closed position.

Additional objects and features of the invention will appear from the following description in which the preferred embodiment has been set forth in detail in conjunction with the accompanying drawings.

BRIEF DESCRIPTION OF THE DRAWINGS

FIG. 1 is a block diagram of the system in which the solar heater panels are elevated relative to the direct return path to the pool.

FIG. 2 is a block diagram of the system in which the solar heater panels may occupy any elevation relative to the direct return path to the pool.

FIG. 3 is an electrical and hydraulic schematic of one practical embodiment of the invention.

DESCRIPTION OF THE PREFERRED EMBODIMENTS

The temperature within a confined body of water may be controlled using heating panels which are disposed in the environment surrounding the body of water. One such practical use for a system based on this principle is a system associated with a swimming pool for controlling the temperature of the water in the pool. In the majority of instances it is desired to elevate the temperature of the water in the pool, although there are times when it may be desirable to reduce the temperature of the water in the pool. For either purpose a system associated with a swimming pool such as that shown in FIG. 1 may be used. An inlet from the pool to the system is shown at the left of FIG. 1, through which water is drawn by the action of a pump 11 which provides water pressure to the inlet of a filter 12. Downstream of filter 12 two return paths may be seen. One path is a direct return path 13 in which a flow direction valve 14 is situated and an alternate path is provided by indirect return path 16 in which is positioned an array of solar heating panels 17.

A solar heat sensor 18 is positioned so as to sense the availability of solar energy for providing heat to the array of heater panels 17. It is usual that solar heat sensor 18 is situated proximate to heater panels 17 as indicated by dashed lines 19 so that the actual solar energy available at the location of heater panels 17 is sensed.

Solar heat sensor 18 provides an output signal or control signal which is electrically connected to a control valve 21. A mode control switch 22 may be provided to interrupt the connection for the control signal from sensor 18, so that the control valve 21 bay be operated in either an automatic mode or a manual mode. When switch 22 is in the manual position the electrical circuit from solar heat sensor 18 to control valve 21 is open, and actuation of control valve 21 must be by manual means. Control valve 21 has the pressure at the inlet to filter 12 connected thereto through a pressure line 23. A control line 24 is connected between control valve 21 and flow direction valve 14. Control valve 21 has an exhaust port 26 to which may be connected an exhaust line 27 extending to the inlet side of pump 11. It may be seen by reference to FIG. 1 that water leaving solar heater panels 17 or passing flow direction valve 14 continues through the remainder of indirect and direct return paths 16 and 13 respectively to the system outlet to the pool as marked at the right side of FIG. 1.

Ths system of FIG. 1 controls the temperature in a confined body of water, such as that within a swimming pool, in the following fashion in one embodiment. Heater panels 17 and indirect return path 16 are elevated to some degree above direct return path 13. Flow direction valve 14 may be of the "pinch" type as disclosed in copending patent application, Ser. No. 455,869 filed March 28, 1974. As may be seen therein, the flow direction valve 14 contains a valve chamber and a pressure port for communicating pressure to the valve chamber. When pressure is introduced to the valve chamber in flow direction valve 14 a flexible member forming one wall of the valve chamber distends inwardly to block the flow through the valve.

With switch 22 in the automatic position (closed) solar heat sensor 18 is set to provide a control signal at a predetermined solar energy level which initiates flow through heating panels 17 thereby transferring heat to water flowing therethrough. The control signal is connected to control valve 21 which communicates pressure line 23 with control line 24 thereby providing pressure to the pressure port of flow direction valve 14. Flow direction valve 14 closes, as described above, blocking flow through direct return path 13 thereby causing the flow from filter 12 to be diverted to indirect return path 16 and through heater panels 17. Heat transferred from heater panels 17 to the water flowing therethrough raises the temperature of the water which is subsequently returned to the pool through the remainder of indirect return path 16 and the system outlet.

When solar heat sensor 18 detects an insufficient level of solar energy for raising the water in the pool above a predetermined temperature. Control valve 21 is returned to a position whereby control line 24 is placed in communication with exhaust port 26. Pressure in the valve chamber of flow direction valve 14 is bled off through control line 24 and exhaust port 26. Means may be provided in the form of exhaust line 27 between exhaust port 26 and the inlet side of pump 11 for positively opening flow direction valve 14 by providing a low pressure to the valve chamber, thereby positively bleeding off the pressure from the valve chamber. Flow direction valve 14 now being in an open condition, the flow from the outlet of filter 12 follows the preferred lower level direct return path 13 to the system outlet to the pool.

In the event it is desired to use the system of FIG. 1 to reduce the temperature of the pool water, switch 22 may be positioned to the manual position. Control valve 21 may now be manually positioned to communicate pressure line 23 with control line 24 closing flow direction vlave 14. As described above the flow at the output of filter 12 is diverted through indirect path 16 and heater panels 17 whereupon it is returned to the pool. If there is insufficient solar energy available to raise the temperature of the water passing through the panels 17 above the predetermined temperature then heat exchange occurs in the opposite direction and the heater panels 17 remove heat energy form the pool water flowing therethrough and pass it to the surrounding environment. The water returns through indirect return path 16 to the pool at a temperature lower than the temperature at which it was drawn from the pool by pump 11. In this fashion the water in the pool may be reduced in temperature to an equlibrium temperature with the environment surrounding heater panels 17.

Referring to FIG. 2 a block diagram is shown of a system for controlling temperature in a confined body of water, such as that contained in a swimming pool, where the heater panels 17 may not be in a position which is elevated relative to the direct return path 13. Items in FIG. 2 which are direct counterparts of items in FIG. 1 are given identical item numbers. The distinctions in FIG. 2, as compared to that of FIG. 1, lie in the insertion of an additional flow direction valve 28 in indirect return path 16, a four-way control valve 29 which replaces control vlave 21, and an additional control line 31 which extends between additional flow direction valve 28 and four-way control valve 29.

Since the relative elevations of direct return path 13 and indirect return path 16 no longer provide for a preferred return through direct path 13, additional flow direction valve 28 becomes necessary. Four-way control valve 29 is configured to alternately connect exhaust port 26 to control line 24 and pressure line 23 to additional control line 31, and exhaust port 26 to additional control line 31 and pressure line 23 to control line 24. When switch 22 is in the closed or automatic position and solar heat sensor 18 determines that an insufficient level of solar energy is available to raise the pool water above the predetermined temperature, four-way control valve 29 is in the first mentioned position. Thus, flow direction valve 14 is open and additional flow direction valve 28 is closed, whereby filtered water returns to the pool through direct flow path 13. When solar heat sensor 18 detects availability of a sufficient level of solar energy to raise the temperature of the pool water above the predetermined temperature, four-way control valve 29 is urged to the last mentioned position thereby closing flow direction valve 14 and opening additional flow direction vlave 28. Filtered water is then directed through indirect return path 16, through heater panels 17 to receive heat transferred therefrom, and returned to the pool.

FIG. 3 is a practical embodiment of the system shown in FIG. 2 and therefore shows all of the necessary elements for a practical embodiment of the system shown in FIG. 1. In FIG. 3 a control box, shown generally at 32, contains an on-off switch S1 for connecting an AC power input to the system. The circuit is fused by a fuse F1. A transformer 33 is shown for providing power to an actuating coil 34 for four-way control valve 29. Solar heat sensor 18 is shown in one embodiment as a thermal switch 36 located proximate to the array of heater panels 17. Switch S2 in control box 32 performs the function of switch 22 in FIGS. 1 and 2. Switch S2 in the closed condition is equivalent to switch 22 in the open or manual position. Conversely switch S2 in the open condition is equivalent to switch 22 in the closed or automatic position. The operation of the system shown in FIG. 3 involves closing switch S1 to place the system in a ready condition. Depending upon whether manual or automatic operation is desired switch S2 is either closed or opened respectively. The remainder of the operation of the system shown in FIG. 3 is the same as that described for the operation of the system shown in FIG. 2 above.

A method for controlling temperature in a confined body of water such as a swimming pool, involves pumping water from the pool and filtering the water. The method further involves diverting the water downstream of the filter through one of two alternate return paths to the pool. Collecting available solar heat is performed in the heating panels. Sensing of an available solar energy level sufficient to provide heat for transfer to the circulated pool water is performed. The method includes routing the filtered water through the path for receiving heat energy from the environmnet when sufficient solar energy availability is sensed, and routing the filtered water directly back to the pool when insuffient availability of solar energy is sensed. The routing of the filtered flow is obtained by connecting pressure upstream of the filter to an appropriate flow direction valve for blocking or opening the appropriate return path to the pool as determined in the solar energy level determination step. The method also includes positive opening of flow direction valves previously closed by introducing a low pressure from a point upstream of the pump to the previously closed valve.

A system and method has been diclosed for controlling temperature in a confined body of water such as that contained in a swimming pool which may be operated manually or automatically. This system and method includes allowance for elevating the temperature of the water above a predetermined temperature and for lowering the temperature of the water to a temperature of equlibrium with the surrounding environment. The system may be used to supplement a conventional pool heating system by directing the system outlet to the conventional heating system inlet prior to return to the pool. The system provides a replacement or supplementary heating system for conventional pool heating systems and requires comparatively low installation, maintenance and operating costs.

I claim:

1. In a system for controlling temperature in a confined body of water having a system inlet and outlet in communication with the body of water, a pump in communication with the inlet for moving the water under pressure, a filter for receiving the water under pressure and having an upstream pressure higher than a downstream pressure, first and second parallel water paths for receiving the water from the filter and being in communication with the system outlet, an array of solar heater panels within the first water path for passing water therethrough and for exchanging heat between the heater panels and the passing water, means for sensing solar energy positioned proximate to the heater panels for providing a control signal related to available solar energy for raising the water temperature above a predetermined temperature, means receiving said control signal for controlling flow alternately in said first and second water paths, a flow direction valve in the second water path for controlling water flow therethrough, a pressure line connected between said means for controlling and the upstream side of the filter for communicating the prefilter pressure to said last named means, and a control line connected between said means for controlling and said flow direction valve, so that when said means for sensing solar energy detects availability of solar energy for raising water temperature above the predetermined temperature, said control signal actuates said means for controlling to communicate said pressure line with said control line, whereby said flow direction valve is closed against filter downstream pressure by filter upstream pressure, and the water is directed through the first water path and said solar heater panels.

2. A system as in claim 1 wherein said solar heater panels in the first water path are elevated relative to the second water path, together with an exhaust line connected to said means for controlling, so that when means for sensing detects insufficient solar energy availability, said exhaust line is communicated with said control line thereby relieving the pressure at said flow direction valve and opening said flow direction valve so that water flows through the second water path to the outlet as the path of least resistance.

3. A system as in claim 1 together with means for interrupting said control signal, and an exhaust port on said control valve, so that when said means for interrupting is in one position said means for controlling is isolated from said control signal and said last named means may thereafter be positioned manually for alternately communicating said pressure line and said exhaust port with said control line, whereby manual closing and opening of said flow direction valve is obtained respectively.

4. A system as in claim 1 together with an additional flow direction valve in the first water path, an additional control line connected between said means for controlling and said additional flow direction valve, and an exhaust port on said control valve, so that when said solar heat sensor senses availability of solar energy for raising the water temperature above said predetermined temperature, said exhaust port is placed in communication with said additional control line, whereby said additional flow direction valve is positively opened.

5. A system as in claim 4 together with an exhaust line connecting the exhaust port to the inlet side of the pump, so that when said control line and said additional control line are alternately placed in communication with said exhaust port said flow direction valve and said additional flow direction valve are alternately positively opened by the low pressure at the pump inlet relative to the pressure of the flow through said valves.

6. A system for heating the water in a swimming pool wherein the system has an inlet from the pool and an outlet to the pool, a pump in communication with the inlet, a filter for receiving the water moved by the pump at the pump pressure, and first and second parallel water paths for conducting the water from the filter and returning the water to the outlet, comprising an array of heater panels for absorbing solar energy, said array being positioned in the first water path, means for sensing solar heat for exposure to solar energy for providing an output signal related to a predetermined solar energy induced temperature, means for controlling connected to receive said output signal, an exhaust port on said means for controlling, a flow direction valve positioned in the second water path, a pressure line connected between the pump outlet and said means for controlling, and a control line connected between said means for controlling and said flow direction valve, said means for controlling being actuated by said output signal to communicate said pressure line with said control line above said predetermined temperature, and said flow direction valve being actuated closed by pressure directed through said control line, whereby the second water path is blocked and substantially all of the water is pumped through the first water path and said array of heater panels for heating the water by transfer of the absorbed solar energy thereto prior to returning the water through the outlet to the pool.

7. A system as in claim 6 together with an exhaust line connected to said exhaust port, wherein said exhaust line is connected to the inlet side of the pump where a pre-pump pressure exists which is lower than said pump pressure, whereby said flow direction valve is positively opened when said output signal is indicative of a temperature below said predetermined solar energy induced temperature and said means for controlling communicates said exhaust port with said control line.

8. A system as in claim 7 together with an additional flow direction valve positioned in the first water path, and an additional control line connected between said means for controlling and said additional flow direction valve, said means for controlling operating to place said pressure line in communication with one of said control and additional control lines, and to place said exhaust port in communication with the other of said additional control and control lines respectively, whereby one of said flow direction and additional flow direction valves is positively closed and the other is positively opened.

9. A system as in claim 6 together with means for interrupting said output signal connected between said means for sensing and said means for controlling, whereby when said means for interrupting is closed said flow direction valve is controlled by said means for sensing, and when said means for interrupting is opened said flow direction valve is controlled by manual actuation of said means for controlling.

* * * * *